Aug. 31, 1937.　　　O. E. NICHOLS　　　2,091,932
MINE TROLLEY WIRE GUARD
Filed May 23, 1936
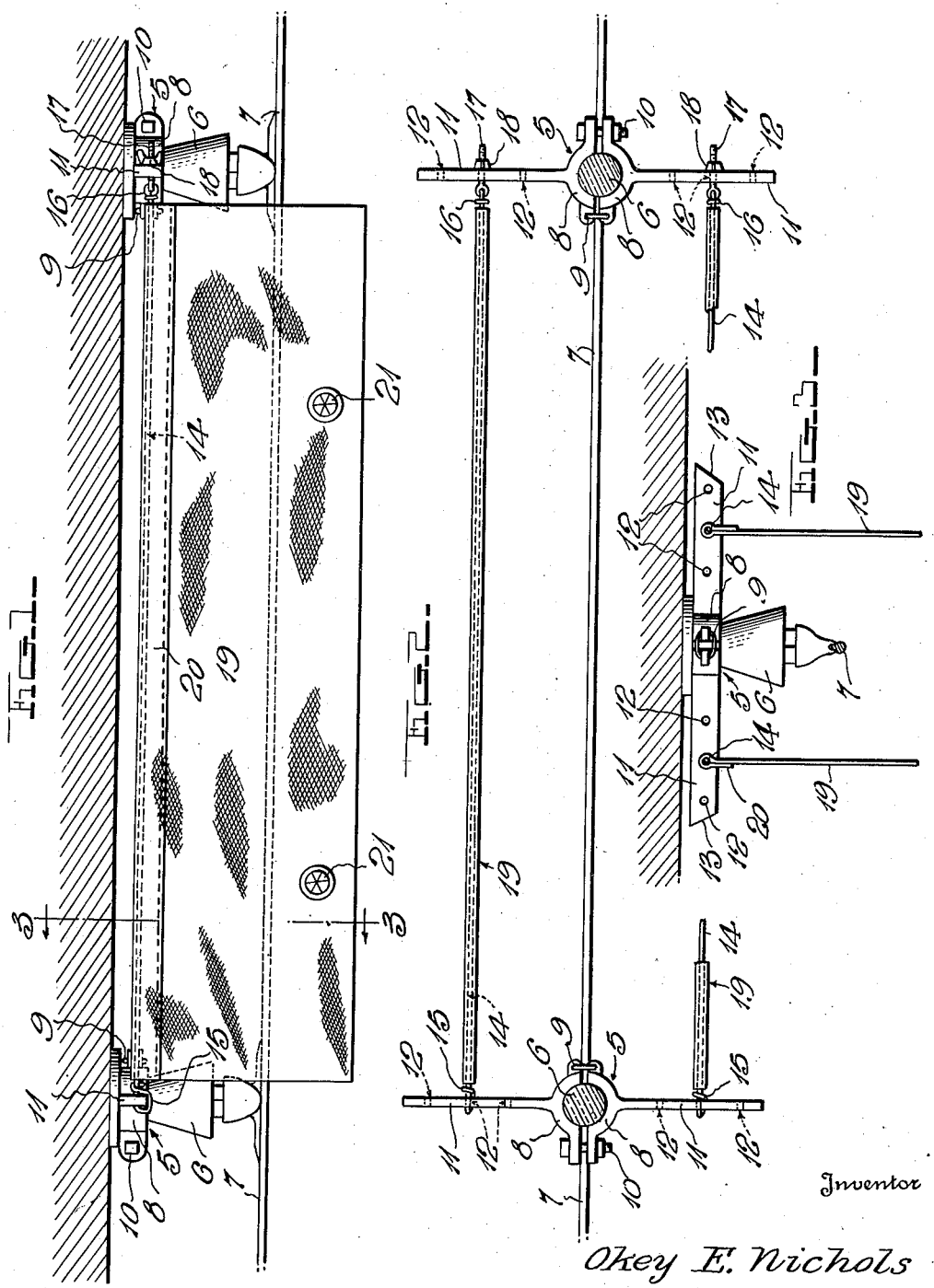
Inventor
Okey E. Nichols Patented Aug. 31, 1937

2,091,932

UNITED STATES PATENT OFFICE 2,091,932

MINE TROLLEY WIRE GUARD

Okey Eugene Nichols, Charleston, W. Va., assignor of twenty-five one-hundredths to Frank Allen, Charleston, W. Va., and seventy-five one-hundredths to Joseph D. Noell, Jr., Washington, D. C.

Application May 23, 1936, Serial No. 81,538

2 Claims. (Cl. 191—33)

The invention relates to trolley wire guards of the type used in mines to prevent the heads of men and draft-animals from possibly coming in contact with overhead trolley wires when passing transversely under them.

The principal object of the invention is to provide a new and improved guard in which the guard elements at opposite sides of the trolley wire are formed from inherently flexible insulating material instead of from relatively rigid material such as wood, fiber board or the like, permitting relatively restricted portions of the guards to yield inwardly into underlying relation with the trolley wire, under pressure which would probably be insufficient to inwardly swing an inherently rigid longitudinal strip to such position, thus preventing a draft-animal's ears, for instance, from striking and failing to move one of the guards and then striking the trolley wire.

Another object of the invention is to provide a guard of exceptionally simple and inexpensive construction, and one which may be quickly and easily installed.

With the foregoing in view, the invention resides in the novel subject matter hereinafter described and claimed, the description being accomplished by reference to the accompanying drawing.

Fig. 1 is a side elevation showing the guard operatively related with a trolley wire and two of the conventional insulators supporting said wire.

Fig. 2 is a top plan view partly in section. Fig. 3 is a transverse sectional view on line 3—3 of Fig. 1.

A preferred construction has been shown and will be rather specifically described, with the understanding however, that within the scope of the invention as claimed, variations may be made.

I provide two clamps 5 to embrace the upper portions of the conventional insulators 6 which support the trolley wire 7, each of said clamps being composed of two semi-circular sections 8 hingedly connected at one end by a link or the like 9, and adjustably connected at their other ends by a bolt 10. The clamp sections 8 are provided with integral horizontal arms 11 which project laterally in opposite directions therefrom, each of these arms being provided with a plurality of openings 12 for a purpose to appear. While the clamps and arms are spaced only a very short distance from the ceiling of the mine tunnel or the like and there is thus little likelihood of anything striking them, the ends of the arms are preferably beveled as at 13 to downwardly deflect anything which might possibly come in contact with them.

Two curtain-supporting wires 14 are disposed at opposite sides of the trolley wire 7 and are connected at their ends with the arms 11, any of the openings 12 being utilized in making the connections, according to the distances which the guards are to be spaced from the trolley wire. At one of its ends, each wire 14 may be passed through one of the openings 12 and twisted as shown at 15. The other end of each wire is by preference similarly connected at 16 with an eyebolt 17 passing through one of the openings 12, so that the wire is provided with a tensioning device for drawing it taut. The nut 18 of the bolt 17 is preferably in the form of a wing-nut but this is not essential.

Two horizontally elongated guard curtains 19 are suspended from and extend longitudinally under the wires 14, said curtains being formed from canvas, rubber or other inherently flexible insulating material. Each curtain is preferably of about twelve feet in length and seven inches in height. The upper edges of the curtains may well be provided with hems or the like 20 in which the wires 14 are located.

If either of the curtains 19 be struck by the head of an animal or a man passing transversely under the wire 7, the portion of the curtain which has been struck, will yield inwardly into underlying relation with said wire 7 and will thus prevent the latter from coming in contact with the head, and this action will take place even if only the ears of a draft-animal should come in contact with one or the other of the curtains. Heretofore, when guards of inherently rigid material such as wood or fiber board have been used, pivotally mounted to swing into underlying relation with the trolley wire, the pressure of a draft-animal's ears against a guard has been insufficient to swing the guard to operative position, with the result that the animal's ears would simply pass under the guard and then strike the trolley wire often with serious results. Moreover, should a person fail to see the guards and strike one of them with his head, he cannot be injured due to the flexible nature of said guards. Then too, loads which will just clear the trolley wire 7 in passing under said wire, even if they strike the guard curtains, cannot injure the latter, whereas conventional guards are often broken in this manner.

I preferably provide each curtain 19 with a plurality of red reflecting buttons 21 which give the appearance of red lights when illuminated by any light rays which may strike them, calling attention to the guard.

It will be seen from the foregoing that novel and advantageous provision has been made for carrying out the objects of the invention, and while the details herein disclosed may be followed if desired, variations may be made within the scope of the invention as claimed.

I claim:—

1. In a trolley wire guard, arms projecting laterally in opposite directions from the trolley wire supporting insulators, taut curtain-supporting wires at opposite sides of the trolley wire and parallel thereto, said curtain-supporting wires having their ends connected with the arms extending on the same side of the trolley wire, and flexible insulating guard curtains hung from and extending longitudinally under said curtain-supporting wires, the height of said curtains being such that when either is swung inwardly to the maximum, it will underlie the trolley wire sufficiently to maintain objects passing transversely thereunder out of electrical contact with said trolley wire.

2. In a trolley wire guard, arms projecting laterally in opposite directions from the trolley wire insulators, curtain-supporting wires at opposite sides of the trolley wire and parallel thereto, said curtain-supporting wires having their ends connected with the arms extending on the same side of the trolley wire, said curtain-supporting wires each having a tensioning device for drawing it taut, and flexible insulating curtains hung from and extending longitudinally under said curtain-supporting wires, the height of said curtains being such that when either is swung inwardly to the maximum, it will underlie the trolley wire sufficiently to maintain objects passing transversely thereunder out of electrical contact with said trolley wire.

OKEY EUGENE NICHOLS.